(12) United States Patent
Qiu et al.

(10) Patent No.: US 7,345,123 B2
(45) Date of Patent: Mar. 18, 2008

(54) FLUOROACRYLATE-MULTIFUNCTIONAL ACRYLATE COPOLYMER COMPOSITIONS

(75) Inventors: Zai-Ming Qiu, Woodbury, MN (US); George G. I. Moore, Afton, MN (US); John C. Clark, White Bear Lake, MN (US); Ramesh C. Kumar, Maplewood, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 129 days.

(21) Appl. No.: 11/027,612

(22) Filed: Dec. 28, 2004

(65) Prior Publication Data

US 2006/0142519 A1    Jun. 29, 2006

(51) Int. Cl.
*C08F 12/20*    (2006.01)
*C08G 75/04*    (2006.01)

(52) U.S. Cl. .................. 526/242; 526/286; 526/319; 528/70; 528/374

(58) Field of Classification Search ............... 526/242, 526/286, 319, 285; 528/28, 70, 374
See application file for complete search history.

(56) References Cited

U.S. PATENT DOCUMENTS

| | | | |
|---|---|---|---|
| 2,803,615 A | 8/1957 | Ahlbrecht et al. | |
| 3,011,988 A | 12/1961 | Luedke et al. | |
| 3,278,352 A | 10/1966 | Erickson | |
| 3,282,905 A | 11/1966 | Fasick et al. | |
| 3,318,852 A | 5/1967 | Dixon | |
| 3,378,609 A | 4/1968 | Fasick et al. | |
| 3,398,182 A | 8/1968 | Guenthner et al. | |
| 3,413,226 A | 11/1968 | Coleman | |
| 3,455,889 A | 7/1969 | Coleman | |
| 3,458,391 A | 7/1969 | Miller, Jr. | |
| 3,459,834 A | 8/1969 | Schmitt | |
| 3,787,351 A | 1/1974 | Olson | |
| 4,321,404 A | 3/1982 | Williams et al. | |
| 4,366,300 A | 12/1982 | Delescluse | |
| 4,513,059 A | 4/1985 | Dabroski | |
| 4,778,915 A | 10/1988 | Lina et al. | |
| 4,792,444 A | 12/1988 | Fukasawa et al. | |
| 4,920,190 A | 4/1990 | Lina et al. | |
| 5,032,460 A | 7/1991 | Kantner et al. | |
| 5,093,398 A | 3/1992 | Rottger et al. | |
| 5,115,059 A | 5/1992 | Le | |
| 5,144,056 A | 9/1992 | Lina et al. | |
| 5,173,547 A | 12/1992 | Rottger et al. | |
| 5,446,118 A | 8/1995 | Shen et al. | |
| 5,688,884 A | 11/1997 | Baker et al. | |
| 5,723,630 A | 3/1998 | Cheburkov | |
| 5,725,789 A * | 3/1998 | Huber et al. ............... 252/8.62 |
| 5,872,180 A | 2/1999 | Michels et al. | |
| 5,883,175 A | 3/1999 | Kubo et al. | |
| 6,001,923 A | 12/1999 | Moncur et al. | |
| 6,114,045 A | 9/2000 | Juhue et al. | |
| 6,121,143 A * | 9/2000 | Messner et al. ............ 438/692 |
| 6,197,378 B1 | 3/2001 | Clark et al. | |
| 6,238,798 B1* | 5/2001 | Kang et al. ................. 428/421 |
| 6,265,060 B1 | 7/2001 | Arudi et al. | |
| 6,482,911 B1 | 11/2002 | Jariwala et al. | |
| 6,500,439 B1 | 12/2002 | Morita et al. | |
| 6,569,521 B1 | 5/2003 | Sheridan et al. | |
| 6,664,354 B2 | 12/2003 | Savu et al. | |
| 6,750,277 B1 | 6/2004 | Yamana et al. | |
| 6,803,109 B2* | 10/2004 | Qiu et al. ................ 428/423.1 |
| 6,890,360 B2 | 5/2005 | Cote et al. | |
| 6,939,580 B2 | 9/2005 | Enomoto et al. | |

(Continued)

FOREIGN PATENT DOCUMENTS

EP    0 712 046 A1    5/1996

(Continued)

OTHER PUBLICATIONS

G. Oertel, Polyurethane Handbook, (1993), 2$^{nd}$ Edition, Hanser/Gardner Publications, Inc., Cincinnati, OH.

(Continued)

*Primary Examiner*—Randy Gulakowski
*Assistant Examiner*—M. Bernshteyn
(74) *Attorney, Agent, or Firm*—Lisa P. Fulton

(57) ABSTRACT

A composition comprises a copolymer comprising repeating units derived from at least one co-reactant comprising two or more acrylate groups and repeating units derived from a fluoroacrylate comprising the reaction product of:

(a) at least one fluorochemical alcohol represented by the formula:

$C_4F_9$—X—OH wherein:

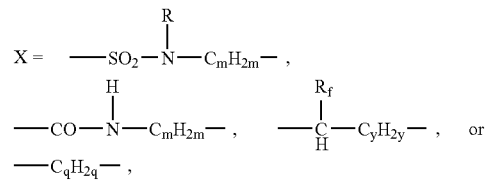

R=hydrogen or an alkyl group of 1 to 4 carbon atoms,
m=2 to 8,
$R_f=C_nF_{2n+1}$,
n=1 to 5,
y 32 0 to 6, and
q=1 to 8;

(b) at least one unbranched symmetric diisocyanate; and
(c) at least one hydroxy-terminated alkyl (meth)acrylate or 2-fluoroacrylate monomer having 2 to about 30 carbon atoms in its alkylene portion;

wherein the composition is coatable.

32 Claims, No Drawings

U.S. PATENT DOCUMENTS

| | | |
|---|---|---|
| 2001/0005738 A1 | 6/2001 | Bruchmann et al. |
| 2003/0001130 A1 | 1/2003 | Qiu |
| 2003/0026997 A1 | 2/2003 | Qiu et al. |
| 2003/0083448 A1 | 5/2003 | Fan et al. |
| 2003/0130457 A1 | 7/2003 | Maekawa et al. |
| 2004/0147188 A1 | 7/2004 | Johnson et al. |
| 2005/0106326 A1 | 5/2005 | Audenaert et al. |
| 2005/0137289 A1 | 6/2005 | Hooftman et al. |
| 2005/0143541 A1 | 6/2005 | Caldwell et al. |
| 2005/0143595 A1 | 6/2005 | Klun et al. |

FOREIGN PATENT DOCUMENTS

| | | |
|---|---|---|
| EP | 0 849 392 A2 | 6/1998 |
| EP | 1 225 187 A1 | 7/2002 |
| EP | 1 225 188 A1 | 7/2002 |
| EP | 1 329 548 A1 | 7/2003 |
| EP | 1 380 628 A1 | 1/2004 |
| FR | 1.468.301 | 12/1966 |
| GB | 870022 | 6/1961 |
| GB | 1 120 304 | 7/1968 |
| JP | 61-148208 | 7/1986 |
| WO | WO 97/14842 A1 | 4/1997 |
| WO | WO 01/30873 A1 | 5/2001 |
| WO | WO 03/048224 A1 | 6/2003 |
| WO | WO 03/062521 A1 | 7/2003 |
| WO | WO 2005/065164 A2 | 7/2005 |
| WO | WO 2005/066224 A1 | 7/2005 |

OTHER PUBLICATIONS

U.S. Appl. No. 11/027,633, filed Dec. 28, 2004, entitled "Water- and Oil-Repellent Fluorourethanes and Fluoroureas".

U.S. Appl. No. 11/027,605, filed Dec. 28, 2004, entitled "Fluoroacrylate-Mercaptofunctional Copolymers".

U.S. Appl. No. 11/027,606, filed Dec. 28, 2004, entitled "Water-Based Release Coating Containing Fluorochemical".

U.S. Appl. No. 11/027,602, filed Dec. 28, 2004, entitled "Fluorochemical Containing Low Adhesion Backsize".

\* cited by examiner

FLUOROACRYLATE-MULTIFUNCTIONAL ACRYLATE COPOLYMER COMPOSITIONS

FIELD

This invention relates to compositions comprising fluoroacrylate-multifunctional acrylate copolymers, and to a method for making the compositions.

BACKGROUND

Pressure sensitive adhesives (PSAs) are adhesives that adhere to substrates merely with the application of light pressure (for example, finger pressure). Silicone-based PSA systems are sometimes preferred for applications requiring high temperature and/or humidity resistance.

Because PSAs adhere to substrates so easily, they are typically provided on a release liner (for example, a backing coated with release coating) to protect them before use. Fluorinated release coatings are often used to provide release properties to silicone-based PSAs because of their low surface energy. Many fluorinated release coatings are not suitable, however, for solvent casting of silicone-based PSAs because they have significant solubility in common solvents.

SUMMARY

In view of the foregoing, we recognize that there is a need in the art for release coatings that are suitable for silicone-based PSA release liners, but that have improved solvent resistance.

Briefly, in one aspect, the present invention provides coatable compositions that are useful as release coatings for PSAs such as, for example, silicone-based PSAs. The compositions comprise a copolymer comprising repeating units derived from at least one co-reactant comprising two or more acrylate groups and repeating units derived from a fluoroacrylate comprising the reaction product of:
(a) at least one fluorochemical alcohol represented by the formula:

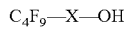

wherein:

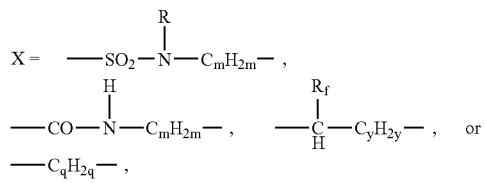

R=hydrogen or an alkyl group of 1 to 4 carbon atoms,
m=2 to 8,
$R_f = C_n F_{2n+1}$,
n=1 to 5,
y=0 to 6, and
q=1 to 8;
(b) at least one unbranched symmetric diisocyanate; and
(c) at least one hydroxy-terminated alkyl (meth)acrylate or 2-fluoroacrylate monomer having 2 to about 30 carbon atoms in its alkylene portion.

As used herein, the term "(meth)acrylate" refers to both acrylates and methacrylates; and the term "coatable" or "coatable composition" means that the composition is soluble or dispersible in solvents or water and is substantially gel-free and, that it can be applied to a substrate using standard coating methods, and that it forms a film upon heating or curing. Gels are single macromolecules formed as an infinite network by crosslinking of polymer chains, and are thus insoluble in all solvents below their decomposition temperature (see, for example, *Principles of Polymerization*, $3^{rd}$ ed., Wiley & Sons, p. 108, (1991)).

The present invention also provides coatable compositions comprising a copolymer comprising the reaction product of
(a) a fluoroacrylate represented by the following general formula:

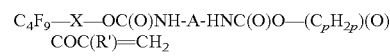

wherein:

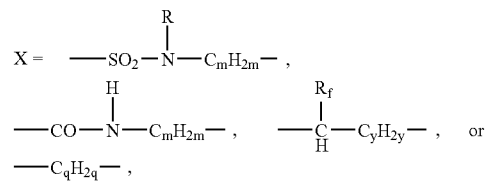

R=H or an alkyl group of 1 to 4 carbon atoms,
m=2 to 8,
$R_f = C_n F_{2n+1}$,
n=1 to 5,
y=0 to 6,
q=1 to 8,
A=an unbranched symmetric alkylene group, arylene group, or aralkylene group,
p=2 to 30, and
R'=H, CH$_3$, or F; and
(b) at least one co-reactant comprising two or more acrylate groups.

Multifunctional acrylates (that is, compounds comprising two or more acrylate groups) are known crosslinkers and are generally avoided during the production of linear polyacrylates in order to avoid forming insoluble or gel-containing product. Gel can interfere with the mechanical delivery of a coating (for example, by plugging the orifices) and with film-formation (see, for example, *Organic Coatings, Science and Technology*, vol. 1, Wicks et al., Wiley & Sons, p. 38 (1992)). Surprisingly, however, the fluoroacrylate-multifunctional acrylate compositions of the present invention are coatable.

The coatable compositions of the invention are useful as release coating for PSAs, including silicone-based PSAs. Release coatings comprising the compositions of the invention have low peel force (for example, about 5 to about 400 g/cm; preferably, about 10 to about 200 g/cm) and high readhesion (for example, not more than about 5% adhesion loss after an adhesive is in contact with the release coating), even after ageing. The cured release coatings also have relatively low solubility in common solvents, and can therefore be used with solvent casted PSAs.

The compositions of the invention therefore meet the need in the art for release coating compositions that are useful as release coatings for PSAs such as, for example, silicone-based PSAs.

In addition, the compositions of the invention exhibit good water- and oil-repellency properties. In light of the prior art, one would expect that compositions comprising fluoroacrylates derived from shorter perfluorinated chains would not be as effective at imparting water- and oil-repellency as those derived from longer perfluorinated chains such as, for example, 8 carbon atom chains (see, for example, U.S. Pat. No. 2,803,615 (Ahlbrecht et al.) and U.S. Pat. No. 3,787,351 (Olson)). The compositions of the invention comprise fluoroacrylates that have perfluorinated groups of 4 carbon atoms, yet surprisingly they exhibit water- and oil-repellency comparably to compositions comprising fluoroacrylates derived from longer perfluorinated chains. This is particularly advantageous because fluoroacrylates that have short chain perfluorinated groups are believed to be less toxic and less bioaccumulative than longer chain perfluorinated groups (see, for example, WO 01/30873).

In another aspect, this invention also provides a method of making coatable compositions comprising reacting a fluoroacrylate with at least one co-reactant comprising two or more acrylate groups, and optionally at least one chain transfer agent, in a reaction solvent to form a copolymer; wherein the fluoroacrylate, co-reactant, and chain transfer agent are present in an amount up to about 35 weight percent (preferably, between about 5 and about 25 weight percent), the weight percent being based upon the total weight of the monomers and the solvent; and the fluoroacrylate is represented by the following general formula:

$$C_4F_9-X-OC(O)NH-A-HNC(O)O-(C_pH_{2p})(O)COC(R')=CH_2$$

wherein:

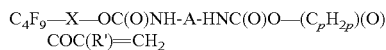
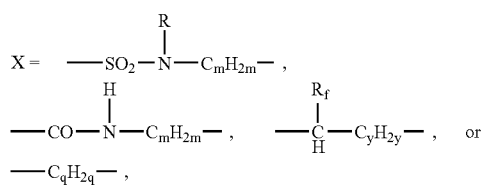

R=H or an alkyl group of 1 to 4 carbon atoms,
m=2 to 8,
$R_f=C_nF_{2n+1}$,
n=1 to 5,
y=0 to 6,
q=1 to 8,
A=an unbranched symmetric alkylene group, arylene group, or aralkylene group,
p=2 to 30, and
R'=H, $CH_3$, or F.

DETAILED DESCRIPTION

Fluoroacrylates useful in the invention are the reaction product of a fluorochemical alcohol, at least one unbranched symmetric diisocyanate, and at least one hydroxy-terminated alkyl (meth)acrylate or 2-fluoroacrylate monomer.

Useful fluorochemical alcohols can be represented by the formula:

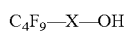

wherein:

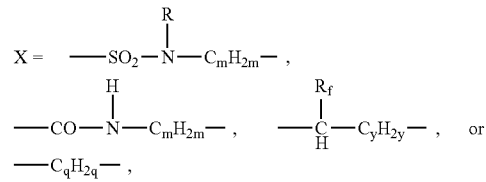

R=hydrogen or an alkyl group of 1 to 4 carbon atoms,
m=2 to 8,
$R_f=C_nF_{2n+1}$,
n=1 to 5,
y=0 to 6, and
q=1 to 8.

Representative examples of suitable alcohols include $C_4F_9SO_2NH(CH_2)_2OH$, $C_4F_9SO_2NCH_3(CH_2)_2OH$, $C_4F_9SO_2NCH_3(CH_2)_4OH$, $C_4F_9SO_2NC_2H_5(CH_2)_6OH$, $C_4F_9(CH_2)_4OH$, $C_4F_9CONH(CH_2)_4OH$, $C_4F_9SO_2NCH_3(CH_2)_3OH$, $C_4F_9SO_2NH(CH_2)_6OH$, $C_4F_9CH_2OH$, $C_4F_9CONH(CH_2)_8OH$, $C_4F_9(CH_2)_2OH$, $C_4F_9SO_2NCH_3(CH_2)_2OH$, $C_4F_9CONH(CH_2)_2OH$, $C_4F_9SO_2NCH_3(CH_2)_6OH$, $C_4F_9SO_2NH(CH_2)_7OH$, $C_4F_9SO_2NC_3H_7(CH_2)_2OH$, $C_4F_9SO_2NC_4H_9(CH_2)_2OH$, $C_4F_9CONH(CH_2)_2OH$, and $C_4F_9(CH_2)_4OH$.

Preferably, m is 2 to 4. Preferably, q is 2.
Preferably, X is

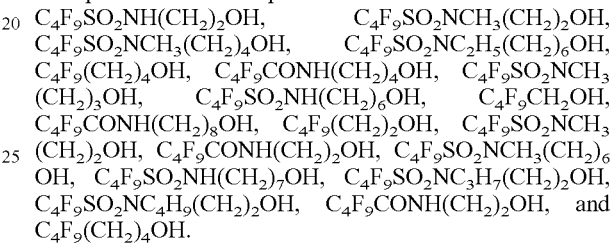

More preferably, X is

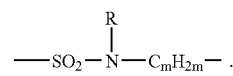

Most preferably, X is selected from the group consisting of

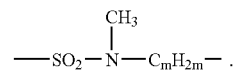
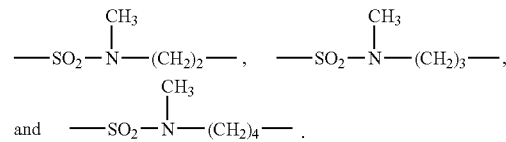

Preferred fluorochemical alcohols include, for example, $C_4F_9SO_2NCH_3(CH_2)_2OH$, $C_4F_9SO_2NCH_3(CH_2)_4OH$, and $C_4F_9(CH_2)_2OH$. A more preferred fluorochemical alcohol is $C_4F_9SO_2NCH_3(CH_2)_2OH$.

Symmetric diisocyanates are diisocyanates that meet the three elements of symmetry as defined by *Hawley's Condensed Chemical Dictionary* 1067 (1997). First, they have a center of symmetry, around which the constituent atoms are located in an ordered arrangement. There is only one such center in the molecule, which may or may not be an atom. Second, they have a plane of symmetry, which divides the molecule into mirror-image segments. Third, they have axes of symmetry, which can be represented by lines passing through the center of symmetry. If the molecule is rotated, it will have the same position in space more than once in a complete 360° turn.

As used herein, the term "unbranched" means that the symmetric diisocyanate does not contain any subordinate chains of one or more carbon atoms.

Representative examples of unbranched symmetric diisocyanates include 4,4'-diphenylmethane diisocyanate (MDI), 1,6-hexamethylene diisocyanate (HDI), 1,4-phenylene diisocyanate (PDI), 1,4-butane diisocyanate (BDI), 1,8-octane diisocyanate (ODI), 1,12-dodecane diisocyanate, and 1,4-xylylene diisocyanate (XDI). Preferably, unbranched symmetric diisocyanates are aromatic.

Preferred unbranched symmetric diisocyanates include, for example, MDI, HDI, and PDI. A more preferred unbranched symmetric diisocyanate is MDI. In its pure form, MDI is commercially available as Isonate™ 125M from Dow Chemical Company (Midland, Mich.), and as Mondur™ from Bayer Polymers (Pittsburgh, Pa.).

Hydroxy-terminated alkyl (meth)acrylate and 2-fluoroacrylate monomers that are useful in the fluoroacrylates of the invention can have from 2 to about 30 carbon atoms (preferably, from 2 to about 12 carbon atoms) in their alkylene portion.

Preferably, the hydroxy-terminated alkyl(meth)acrylate monomer is a hydroxy-terminated alkyl acrylate. Preferred hydroxy-terminated alkyl acrylates include, for example, hydroxy ethyl acrylate, hydroxy butyl acrylate, hydroxy hexyl acrylate, hydroxy decyl acrylate, hydroxy dodecyl acrylate, and mixtures thereof.

The fluoroacrylates useful in the invention can be prepared, for example, by first combining the fluorochemical alcohol and unbranched symmetric diisocyanate in a solvent, and then adding the hydroxy-terminated alkyl(meth)acrylate. Useful solvents include esters (for example, ethyl acetate), ketones (for example, methyl ethyl ketone), ethers (for example, methyl-tert-butyl ether), and aromatic solvents (for example, toluene).

Preferably, the reaction mixture is agitated. The reaction can generally be carried out at a temperature between room temperature and about 120° C. (preferably, between about 50° C. and about 70° C.).

Typically the reaction is carried out in the presence of a catalyst. Useful catalysts include bases (for example, tertiary amines, alkoxides, and carboxylates), metal salts and chelates, organometallic compounds, acids and urethanes. Preferably, the catalyst is an organotin compound (for example, dibutyltin dilaurate (DBTDL) or a tertiary amine (for example, diazobicyclo[2.2.2]octane (DABCO)), or a combination thereof. More preferably, the catalyst is DBTDL.

When fluorochemical alcohols represented by the formula $C_4F_9SO_2NCH_3(CH_2)_mOH$, wherein m=2 to 4, are reacted with MDI, the process described in U.S. patent application Ser. No. 10/751142, entitled "Process For Preparing Fluorochemical Monoisocyanates," filed on Dec. 31, 2003, can be used.

Fluoroacrylates useful in the compositions of the invention can be represented by the following general formula:

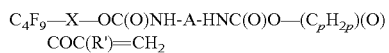

wherein:

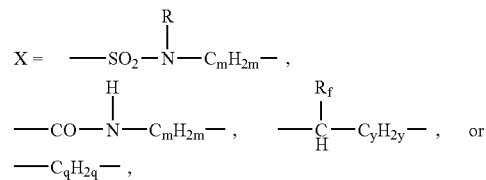

R=H or an alkyl group of 1 to 4 carbon atoms,
m=2 to 8,
$R_f=C_nF_{2n+1}$,
n=1 to 5,
y=0 to 6,
q=1 to 8,
A=an unbranched symmetric alkylene group, arylene group, or aralkylene group,
p=2 to 30, and
R'=H, CH$_3$, or F.
Preferably, q is 2.
Preferably, X is

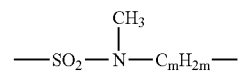

and m is 2 to 4.
Preferably, A is selected from the group consisting of $C_6H_{12}$,

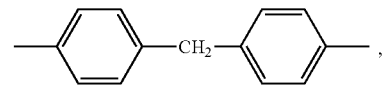

and

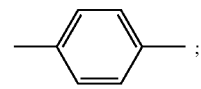

more preferably, A is

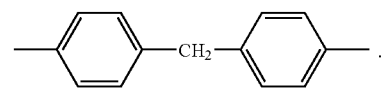

Preferably, p is 2 to 12; more preferably, p is selected from the group consisting of 2, 4, 6, 10, and 12; most preferably, p is 2.
Preferably, R' is H.

The fluoroacrylates described above can be reacted with co-reactants comprising two or more acrylate groups to form copolymers that are useful in the compositions of the invention. Preferably, the co-reactant is a tri(meth)acrylate or a di(meth)acrylate (that is, a compound comprising three or two acrylate groups). More preferably, it is a di(meth) acrylate (that is, a compound comprising two acrylate groups).

Useful tri(meth)acrylates include, for example, trimethylolpropane tri(meth)acrylate, propoxylated trimethylolpropane triacrylates, ethoxylated trimethylolpropane triacrylates, tris (2-hydroxy ethyl)isocyanurate triacrylate, and pentaerythritol triacrylate. Useful di(meth)acrylates include, for example, ethylene glycol di(meth)acrylate, diethylene glycol di(meth)acrylate, triethylene glycol di(meth)acrylate, tetraethylene glycol di(meth)acrylate, 1,4-butanediol di(meth)acrylate, 1,6-hexanediol di(meth)acrylate, alkoxylated 1,6-hexanediol diacrylates, tripropylene glycol diacrylate, dipropylene glycol diacrylate, cyclohexane dimethanol di(meth)acrylate, alkoxylated cyclohexane dimethanol diacrylates, ethoxylated bisphenol A di(meth)acrylates, neopentyl glycol diacrylate, polyethylene glycol di(meth)acrylates, polypropylene glycol di(meth)acrylates, urethane di(meth) acrylates and $CH_2=CHCO_2CH_2CH_2OC(O)NHC_6H_4CH_2C_6H_4NHCOOCH_2CH_2OC(O)CH=CH_2$ (HMH). Preferred di(meth)acrylates include, for example polyethylene glycol di(meth)acrylates, polypropylene glycol di(meth)acrylates, 1,4-butanediol di(meth)acrylate, 1,6-hexanediol di(meth)acrylate, and HMH.

Fluorinated di(meth)acrylates such as, for example $C_4F_9SO_2N(CH_2CH_2OC(O)CH=CH_2)_2$ and $CH_2=CHCO_2CH_2CF_2(OCF_2CF_2)_n(OCF_2)_mCH_2OC(O)CH=CH_2$, are also useful.

Many useful co-reactants are commercially available.

The fluoroacrylate and co-reactant can also be copolymerized with one or more optional comonomers or functionalized comonomers in order to modify the properties and performance for different applications.

The peel force of the coatable compositions of the invention can be tailored by varying the amount and type of co-reactant used.

Chain transfer agents can be used to promote chain termination and limit gel formation. Useful chain transfer agents include, for example, thiols, secondary alcohols, and polyhalocarbons. Examples of commercially available chain transfer agents include tetrabromomethane, isopropanol, 1-hexanethiol, 1-heptanethiol, 1-octanethiol, 1-nonanethiol, 1-decanethiol, 1-dodecanethiol, 1-octadecyl mercaptan, 1-pentadecanethiol, 1-hexadecyl mercaptan, tert-nonyl mercaptan, tert-hexadecyl mercaptan, tert-tetradecyl mercaptan, 2-(butylamino)ethanethiol, 11-mercapto-1-undecanol, n-butyl 3-mercaptopropionate, thioglycolic acid, 3-mercaptopropionic acid, 4-mercaptobutyric acid, 11-mercaptoundecanoic acid, 2-mercaptoethanesulfonic acid, 6-mercapto-1-hexanol, mercaptoacetic acid n-octyl ester, 3-mercaptopropyltrimethoxysilane, 3-mercaptoproyltriethoxysilane, 2-mercaptoethyltriethoy silane, 3-mercaptopropylmethyldimethoxysilane, 3-mercaptopropionic acid octadecyl ester, 2-ethylehexyl 3-mercaptopropionate, 1H,1H,2H,2H-perfluorohexanethiol, 1H,1H,2H,2H-perfluorododecyl-1-thiol.

Comonomers such as, for example, alkyl acrylates can improve durability and film-forming properties. Representative examples of useful comonomers include methyl (meth)acrylate, butyl acrylate, isobutyl(meth)acrylate, hexyl acrylate, dodecyl acrylate, and octadecyl acrylate.

Other comonomers can modify properties such as, for example, adhesion, hydrophilicity, reactivity, or glass transition temperature. Groups that are useful in comonomers include, for example, hydroxy, carboxy, quaternary ammonium, acetate, pyrrolidine, polyethylene glycol, sulfonic acid, trialkoxysilane, and silicone. Useful comonomers include, for example, hydroxy ethyl acrylate, hydroxy butyl acrylate, hydroxy hexyl acrylate, hydroxy decyl acrylate, hydroxy dodecyl acrylate, acrylic acid, methacrylic acid, N-vinyl 2-pyrrolidinone, and hydroxypropyl acrylic acid, 2-methacryloxypropyltrimethoxysilane, 3-methacryloxypropyltriethoxysilane, 3-acryloxypropyltrimethoxysilane, 3-methacryloxypropyltrichlorosilane, glycidyl methacrylate, glycidyl acrylate, N-methylol methacrylamide, and N-methylol acrylamide.

The copolymers useful in the coatable compositions of the invention can be prepared, for example, by combining the fluoroacrylate and co-reactant in a reaction solvent. Typically the weight ratio of co-reactant to fluoroacrylate is about 35:65 or less. Preferably, the weight ratio is about 20:80 or less (more preferably, 15:85 or less) when there is no chain transfer agent.

Comonomers can typically be present in amounts up to about 30 weight percent (preferably, about 5 to about 10 weight percent), based upon the total weight of monomers.

Useful reaction solvents include esters (for example, ethyl acetate), ketones (for example, methyl ethyl ketone), ethers (for example, methyl-tert-butyl ether), amides (for example, dimethyl formamide), and alcohols.

Preferably, the reaction mixture is agitated. The reaction can generally be carried out at a temperature between about room temperature and about 120° C. (preferably, between about 50° C. and about 70° C.).

The reaction is carried out using an initiator. Useful initiators include, for example, substituted azonitrile compounds, peroxides, peracids, and peresters. Specific examples of useful initiators include 2,2-azo-bis-(isobutyronitrile), dimethyl 2,2'-azo-bis-isobutyrate, azo-bis-(diphenylmethane), 4-4'-azo-bis(4-cyanopentanoic) acid, 1,1'-azo-bis-(cyclohexane carbonitrile), 2,2'-azo-bis-(2-methyl butyronitrile), 2,2'-azo-bis-(2,4-dimethyl valeronitrile), azo-bis-dimethyl valeronitrile, 4,4'-azo-bis-(4-cyanovaleric acid), benzoyl peroxide, cumyl peroxide, tert-butyl peroxide, cyclohexanone peroxide, glutaric acid peroxide, lauroyl peroxide, methyl ethyl ketone peroxide, hydrogen peroxide, hydroperoxides such as tert butyl hydroperoxide and cumene hydroperoxide, peracetic acid, perbenzoic acid, diisopropyl percarbonate, and the like.

Typically, the polymerization of multifunctional acrylates results in gelling, and therefore the resulting compositions are not coatable (see, for example, *Principles of Polymerization*, $2^{nd}$ ed., Wiley & Sons, p. 114 (1981)). Surprisingly, however, when fluoroacrylates and multifunctional acrylates are polymerized using the method of the invention, gelling does not occur.

The coatable compositions of the invention can be used to impart release properties or water-and oil-repellency to a wide variety of substrates. The coatable compositions are preferably diluted or dispersed in a liquid (for example, water and/or an organic solvent) before coating a substrate. Preferably, the coating compositions contain from about 5 to about 15 percent solids (more preferably, about 2 to about 10 percent), based upon the weight of the coating composition.

The coatable compositions can be applied to fibrous substrates (for example, woven, knit, and non-woven fabrics, textiles, carpets, leather, or paper) to impart water- and oil-repellency.

The coatable compositions can be applied to a substrate (or articles comprising a substrate) by standard methods such as, for example, spraying, padding, dipping, roll coating, brushing, or exhaustion. The composition can then be dried to remove any remaining water or solvent. Preferably, the coated composition is heated to a temperature between about 100° C. and about 175° C.

The coatable compositions are useful as release coatings, and can be applied to surfaces requiring release properties from adhesives. Surprisingly, dried coatable compositions of the invention show significant solvent resistance. The coatable compositions can therefore be used as release coatings for solvent cast adhesives. Substrates suitable for release coatings include, for example, paper, metal sheets, foils, non-woven fabrics, polyolefin coated paper, and films of thermoplastic resins such as polyesters, polyamides, polyolefins, polycarbonates, and polyvinyl chloride.

Release coating compositions can be applied to suitable substrates by conventional coating techniques such as, for example, wire-wound rod, direct gravure, offset gravure, reverse roll, air-knife, and trailing blade coating. The resulting release coating compositions can provide effective release for a wide variety of pressure sensitive adhesives such as, for example, natural rubber based adhesives, silicone based adhesives, acrylic adhesives, and other synthetic film-forming elastomeric adhesives.

EXAMPLES

Objects and advantages of this invention are further illustrated by the following examples, but the particular materials and amounts thereof recited in these examples, as well as other conditions and details, should not be construed to unduly limit this invention.

| Designator | Name, Formula and/or Structure | Availability |
|---|---|---|
| PEGDA-700 | Polyethylene glycol diacrylate $CH_2$=$CHCO_2(C_2H_4O)_nC(O)CH$=$CH_2$ Mn Ca. 700 | Sigma Aldrich, Milwaukee, WI |
| PEGDA-1100 | Polyethylene glycol (1000) diacrylate $CH_2$=$CHCO_2(C_2H_4O)_nC(O)CH$=$CH_2$ Mn ca. 1100 | ABCR GmbH & CO. KG, Karlsruhe GERMANY |
| DEGDA | Diethylene glycol diacrylate $CH_2$=$CHCO_2(C_2H_4O)_2C(O)CH$=$CH_2$ | Sigma Aldrich |
| SR-344 | Polyethylene glycol (400) diacrylate (Mw~508) $CH_2$=$CHCO_2(C_2H_4O)_nC(O)CH$=$CH_2$ | Sartomer Company Exton, PA |
| SR-610 | Polyethylene glycol (600) diacrylate (Mw~742) $CH_2$=$CHCO_2(C_2H_4O)_nC(O)CH$=$CH_2$ | Sartomer Company Exton, PA |
| SR-644 | Polypropylene glycol (400) dimethacrylate $CH_2$=$CMeCO_2(C_2H_4O)_nC(O)CMe$=$CH_2$ | Sartomer Company Exton, PA |
| SR-230 (DEGDA) | Diethylene glycol diacrylate $CH_2$=$CHCO_2C_2H_4OC_2H_4OCO_2CH$=$CH_2$ | Sartomer Company Exton, PA |
| SR-213 (BDDA) | 1,4-Butanediol diacrylate $CH_2$=$CHCO_2(CH_2)_4OC(O)CH$=$CH_2$ | Sartomer Company Exton, PA |
| HDDA | 1,6-Hexanediol diacrylate $CH_2$=$CHCO_2(CH_2)_6OC(O)CH$=$CH_2$ | Sigma Aldrich |
| ODA | Octadecyl acrylate $CH_2$=$CHCO_2(CH_2)_{17}CH_3$ | Sigma Aldrich |
| BA | n-Butyl acrylate $CH_2$=$CHCO_2(CH_2)_3CH_3$ | Sigma Aldrich |
| VC12 | Vinylidene chloride $CH_2$=$CCl_2$ | Sigma Aldrich |
| DMAEMA | 2-(Dimethylamino)ethyl methacrylate $CH_2$=$CMeCO_2CH_2CH_2NMe_2$ | Sigma Aldrich |
| IEM | 2-Isocyanatoethyl methacrylate $CH_2$=$CMe\ CO_2CH_2CH_2NCO$ | Sigma Aldrich |
| BO | 2-Butanone oxime HO—N=$CMeCH_2CH_3$ | Sigma Aldrich |
| A-174 | 3-Methacryloxypropyltrimethoxysilane $CH_2$=$C(CH_3)CO_2C_3H_6Si(OMe)_3$ | Sigma Aldrich, |
| NMA | N-(Hydroxymethyl)methacrylamide $CH_2$=$CMeCONHCH_2OH$ | Sigma Aldrich |
| DBTDL | Dibutyltin dilaurate | Sigma Aldrich |
| DDS | Dodecylthiol; $CH_3(CH_2)_{11}SH$ | Sigma Aldrich |
| TDDM | t-Dodecyl mercaptan | Sigma Aldrich |
| A-189 | 3-Mercaptopropyltrimethoxysilane HS $(CH_2)_3Si(OMe)_3$ | Sigma Aldrich |
| HEA | 2-Hydroxyethyl acrylate; $HOCH_2CH_2OC(O)CH$=$CH_2$ | Sigma Aldrich |
| MDI | 4,4'-methylenebis(phenyl isocyanate); | Sigma-Aldrich |

-continued

| Designator | Name, Formula and/or Structure | Availability |
|---|---|---|
| | OCN-C6H4-CH2-C6H4-NCO | |
| EtOAC | Ethyl acetate $CH_3CO_2CH_2CH_3$ | Sigma-Aldrich |
| DMF | N,N-Dimethylformamide $HC(O)NMe_2$ | Sigma-Aldrich |
| IPA | Isopropanol $(CH_3)_2CHOH$ | Sigma-Aldrich |
| MEK | Methyl ethyl ketone | Sigma-Aldrich |
| NMP | N-methylpyrrolidone | Sigma-Aldrich |
| TMPTA SR-351 | Trimethylolpropane Triacrylate $(CH_2CHCOOCH_2)_3CC_2H_5)$ | Sartomer Company Exton, PA |
| PETA SR-494 | Pentaerythritol tetraacrylate | Sartomer Company Exton, PA |
| LTMDA | Perfluoropolyether diacrylate $CH_2=CHCO_2(C_2F_4O)_n(CF_2O)_mC(O)CH=CH_2$ Mn ca. 2000 | Solvay Solexis, Inc. Italy |
| VAZO-67 | 2,2'azobis(2-cyanopentane) | DuPont, Wilmington, DE |

Test Method:

Dynamic Contact Angle Measurement

A test solution, emulsion, or suspension (typically at about 3% solids) was applied to nylon 66 film (available from DuPont) by dip-coating strips of the film. Prior to coating the film was cleaned with methyl alcohol. Using a small binder clip to hold one end of the nylon film, the strip was immersed in the treating solution, and then withdrawn slowly and smoothly from the solution. The coated strip was allowed to air dry in a protected location for a minimum of 30 minutes and then was cured for 10 minutes at 150° C.

Advancing and receding contact angles on the coated film were measured using a CAHN Dynamic Contact Angle Analyzer, Model DCA 322 (a Wilhelmy balance apparatus equipped with a computer for control and data processing, commercially available from ATI, Madison, Wis.). Water and hexadecane were used as probe liquids. Values for both water and hexadecane are reported.

Preparation of $CH_2=CHCO_2CH_2CH_2OC(O)$ $NHC_6H_4CH_2C_6H_4NHCOOCH_2CH_2OC(O)$ $CH=CH_2$ (HMH or HEA-MDI-HEA)

A solution of 69.0 g 4,4'-methylenebis(phenyl isocyanate) (0.276 mol) and 85.0 g (0.733 mol) 2-hydroxyethyl acrylate in 400 mL anhydrous THF was treated with 3 drops DBTDL. A mild exotherm ensued and the mixture was stirred at 50° C. for 3 hours. Infrared spectroscopy indicated complete conversion of the isocyanate. The THF was allowed to evaporate and the residue was slurried in 400 mL water for 2 hours, filtered, and the white solid was washed well with water and dried to 129.8 g. H-NMR confirmed the desired structure in high purity.

Preparation of $CH_2=CMeCO_2CH_2CH_2NHC(O)O—$ $N=CMeCH_2CH_3$ (IEMEKO)

To a 120 ml bottle was added 15.5 g (100 mmole) 2-isocyanatoethyl methacrylate (IEM), 8.7 g 2-butanone oxime (BO, 100 mmole), 56 mL ethyl acetate, 2 drops DBTDL and 3 mg phenothiazine under nitrogen. The solution was heated to 60° C., and reacted for 24 hours. Infrared spectroscopy analysis indicated the complete conversion of the isocyanate.

Preparation of $C_4F_9SO_2N(CH_3)CH_2CH_2OH$ (MeFBSE)

MeFBSE was prepared by essentially following the procedure described in U.S. Pat. No. 6,664,354 (Savu et al.), Example 2, Part A.

Preparation of $C_4F_9SO_2N(CH_3)C_2H_4OC(O)$ $NHC_6H_4CH_2C_6H_4NCO$ (MeFBSE-MDI)

A one liter, three-necked round bottom flask, fitted with a heater, nitrogen inlet, reflux condenser and thermocouple was charged with MeFBSE (357.0 g; 1.0 mole) MEK (600 mL) and heated to reflux, while distilling out 30 mL of MEK. The mixture was then cooled to 30° C. and treated with MDI (750 g; 3.0 mole). The temperature of the mixture was then increased to about 40° C. for 4 hours, filtered and added to toluene (4 l). The resulting off white precipitate was collected by filtration, and re-crystallized from toluene (white solid; 689.4 g; 57% yield). Structure was confirmed using liquid chromatography/mass spectroscopy (LC/MS) and LC/UV analysis.

Preparation of $C_4F_9SO_2N(CH_3)C_2H_4OC(O)$ $NHC_6H_4CH_2C_6H_4NHCOOCH_2CH_2OC(O)$ $CH=CH_2$ (MeFBSE-MDI-HEA or C4MH)

A one liter flask containing 500 ml ethyl acetate was heated to reflux under $N_2$, and 100 mL of ethyl acetate was distilled out. The remaining solvent was cooled under dry air and treated with 151.9 g MeFBSE-MDI, 29.1 g 2-hydroxyethyl acrylate, 2 drops DBTDL, and 7 mg phenothiazine. After 5 hr at 50° C., infrared spectroscopy indicated complete conversion of the isocyanate. The cloudy solution was filtered through 40 g diatomaceous earth and rinsed with hot ethyl acetate to give 473.5 g clear solution, (29.6% solids, yield as MeFBSE-MDI-HEA, 77%).

Preparation of $C_4F_9SO_2N(CH_3)CH_2CH_2OC(O)CH=CH_2$ (MeFBSEA)

MeFBSEA was prepared by essentially following the procedure described in U.S. Pat. No. 6,664,354 (Savu et al.) Example 2, Part A & B.

Preparation of $C_4F_9SO_2N$ ($CH_2CH_2OC(O)CH=CH_2$)$_2$ (MFBSEEAAE)

MeFBSEEAA was prepared by following the procedure described in U.S. Pat. No. 6,238,798 (Kang et al.).

Preparation of an acrylic ester of a polyether, $CH_3(OCH_2CH_2)_nOC(O)CH=CH_2$ (CW750A)

An acrylate ester of a polyether containing an average of about 16 repeating ethoxy units was prepared as described in U.S. Pat. No. 5,648,166 (see Example 3).

General Procedure for Examples and Comparative Examples Listed in Tables 1-3

For each example and comparative example, a 120 ml bottle was charged with 3.0-10.0 g of the fluoroacrylate listed in the table (prepared essentially as described above for MeFBSE-MDI-HEA), 0-25% diacrylate by weight and optionally a third hydrocarbon (meth)acrylate monomer in the presence or absence of a chain transfer agent, 15-40 mg VAZO-67, and sufficient ethyl acetate to yield a 15-30% by weight concentration of monomers. After purging with nitrogen for 35-60 seconds, the bottle was sealed and the mixture polymerized in a 70° C. oil bath for 17-44 hrs. The obtained polymers were then examined visually to determine if they had gelled and recorded in Table 1 and 2 below. The advancing and receding contact angles for the resulting polymers were determined as described above and the results were reported in Table 3 below.

Detailed Procedures for Selected Examples in Table 1

Example 1

Preparation of C4MH/PEGDA-700 (90/10) at 20% Solids

A 1 liter bottle was charged with 246 g C4MH solution (36.6% solid, 90 g solid, MW=723, 124.5 mmol) in ethyl acetate (EtOAc), 10 g polyethylene glycol diacrylate with molecular weight ~700 (PEGDA-700), 244 g additional EtOAc and 1.0 g VAZO-67. A magnetic stir bar was added. The solution was bubbled with nitrogen for two minutes. The sealed bottle was put in a 70° C. oil bath and polymerized with magnetic stirring for 24 hours. The obtained 20% solid polymer solution was a clear solution without gelation at 70° C. Some polymer crystallization occurred when cooled to room temperature. The crystallized polymer was re-dissolved by simply heating the solution or adding a polar solvent such as N,N-dimethylformamide (DMF) or N-methylpyrrolidone (NMP). Chromatographic analysis of the solution showed Mn~11,300, Mw~121,000, and Mw/Mn=1.02. Contact angles were measured and reported Table 3.

Comparative Example 1 (C1)

Preparation of C4MH/PEGDA-700 (80/20) at 20% Solids

A 120ml bottle was charged with 21.37 g C4MH solution (37.5% solid, 8.01 g solid, MW=723, 4.15 mmol) in ethyl acetate (EtOAc), 2.03 g polyethylene glycol diacrylate with molecular weight ~700 (PEGDA-700), 26.8 g additional EtOAc and 0.15 g VAZO-67. A magnetic stir bar was added. The solution was bubbled with nitrogen for two minutes. The sealed bottle was put in a 70° C. oil bath and polymerized with magnetic stirring. The polymer solution gelled after 10 hours.

Example 21

Preparation of C4MH/PEGDA-700/NMA (86/10/4) at 20% Solids

A 120 ml bottle was charged with 22.97 g C4MH solution (37% solid, 8.5 g solid, MW=723, 11.75 mmol) in ethyl acetate (EtOAc), 1.5 g polyethylene glycol diacrylate with molecular weight ~700 (PEGDA-700), 2.08 g NMA aqueous solution (~48% solid, 0.998 g solid), 28.45 g IPA and 0.15 g VAZO-67. A magnetic stir bar was added. The solution was bubbled with nitrogen for two minutes. The sealed bottle was put in a 70° C. oil bath and polymerized with magnetic stirring for 24 hours. A 20% solid clear polymer solution was obtained without gelation at 70° C. Some polymer crystallization occurred when cooled to room temperature. The crystallized polymer was re-dissolved by simply heating the solution or adding a polar solvent such as N,N-dimethylformamide (DMF) or N-methylpyrrolidone (NMP).

Comparative Example 9 (C9)

Preparation of MeFBSEA/PEGDA-700 (90/10) at 20% Solids

A 120 ml bottle was charged with 4.5 g MeFBSEA (MW=411, 10.9 mmol), 0.50 g polyethylene glycol diacrylate with molecular weight ~700 (PEGDA-700), 20 g EtOAc and 20 mg VAZO-67. A magnetic stir bar was added. The solution was bubbled with nitrogen for two minutes. The sealed bottle was put in a 60° C. oil bath and polymerized with magnetic stirring. The polymer solution gelled after 10 hours.

TABLE 1

Examples 1-33 and Comparative Examples C1-C12

| Example | Formulation | Wt ratio | Solid % | Hours @ 60~70° C. | Results |
|---|---|---|---|---|---|
| 1 | C4MH/PEGDA-700 | 90/10 | 20 | 44 | OK |
| 2 | C4MH/PEGDA-700 | 85/15 | 20 | 24 | OK |
| C1 | C4MH/PEGDA-700 | 80/20 | 20 | 24 | Gelled |

TABLE 1-continued

Examples 1-33 and Comparative Examples C1-C12

| Example | Formulation | Wt ratio | Solid % | Hours @ 60~70° C. | Results |
|---|---|---|---|---|---|
| 3 | C4MH/PEGDA-700 | 80/20 | 15 | 24 | OK |
| 4 | C4MH/PEGDA-700 | 90/10 | 25 | 24 | OK |
| C2 | C4MH/PEGDA-700 | 90/10 | 30 | 24 | Gelled |
| 5 | C4MH/PEGDA-1100 | 80/20 | 20 | 24 | OK |
| 6 | C4MH/SR-644 | 90/10 | 20 | 24 | OK |
| 7 | C4MH/SR-644 | 85/15 | 20 | 24 | OK |
| 8 | C4MH/SR-213 | 90/10 | 20 | 44 | OK |
| C3 | C4MH/SR-213 | 80/20 | 20 | 4 | Gelled |
| 9 | C4MH/HMH | 100/0 | 20 | 44 | OK |
| 10 | C4MH/HMH | 95/5 | 20 | 44 | OK |
| 11 | C4MH/HMH | 90/10 | 20 | 44 | OK |
| 12 | C4MH/HMH | 85/15 | 20 | 44 | OK |
| C4 | C4MH/HMH | 80/20 | 20 | 19 | Gelled |
| 13 | C4MH/HDDA | 95/5 | 20 | 44 | OK |
| 14 | C4MH/HDDA | 90/10 | 25 | 24 | OK |
| 15 | C4MH/HDDA | 85/15 | 25 | 24 | OK |
| 16 | C4MH/PEGDA-700/ODA | 70/10/20 | 20 | 24 | OK |
| 17 | C4MH/PEGDA-700/VCl$_2$ | 80/10/10 | 20 | 24 | OK |
| 18 | C4MH/PEGDA-700/DMAEMA | 85/10/5 | 20 | 24 | OK |
| 19 | C4MH/PEGDA-700/IEMEKO | 80/10/10 | 20 | 24 | OK |
| 20 | C4MH/PEGDA-700/A-174 | 86/10/4 | 20 | 24 | OK |
| 21 | C4MH/PEGDA-700/NMA | 77/14/9 | 20 | 24 | OK |
| 22 | C4MH/CW750A/HMH | 85/10/5 | 20 | 44 | OK |
| 23 | C4MH/CW750A/DEGDA | 85/10/5 | 20 | 44 | OK |
| 24 | C4MH/CW750A/BDDA | 85/10/5 | 20 | 44 | OK |
| 25 | C4MH/CW750A/HDDA | 89/9/2 | 20 | 20 | OK |
| C5 | C4MH/CW750A/HDDA | 84/9/7 | 20 | 20 | Gelled |
| 26 | C4MH/ODA/HDDA | 63/27/10 | 15 | 24 | OK |
| 27 | C4MH/BA/HMH | 90/10/5 | 20 | 44 | OK |
| 28 | C4MH/TMPTA | 90/10 | 20 | 24 | OK |
| C6 | C4MH/TMPTA | 80/20 | 20 | 17 | Gelled |
| 29 | C4MH/PETA | 90/10 | 20 | 17 | OK |
| C7 | C4MH/PETA | 80/20 | 20 | 17 | Gelled |
| C8 | MeFBSEA/TMPTA | 90/10 | 20 | 17 | Gelled |
| C9 | MeFBSEA/HDDA | 90/10 | 20 | 22 | Gelled |
| C10 | MeFBSEA/HDDA | 85/15 | 20 | 15 | Gelled |
| C11 | MeFBSEA/HMH | 90/10 | 20 | 22 | Gelled |
| C12 | MeFBSEA/PEGDA-700 | 90/10 | 20 | 22 | Gelled |
| 30 | C4MH/FBSEEAA | 90/10 | 20 | 24 | OK |
| 31 | C4MH/FBSEEAA/SR-610 | 90/5/5 | 20 | 24 | OK |
| 32 | C4MH/LTMDA | 90/10 | 20 | 24 | OK |
| 33 | C4MH/LTMDA/SR-610 | 80/10/10 | 20 | 24 | OK |

Effect of Chain Transfer Agent

Detailed Procedures for Selected Examples in Table 2

Example 35

Preparation of C4MH/PEGDA-700/DDS (76/20/4) at 30% Solids

A 120 ml bottle was charged with 4.50 g C4MH solid (MW=723, 5.53 mmol), 0.50 g PEGDA-700, 0.10 g DDS, 11.67 g EtOAc and 0.049 g VAZO-67. A magnetic stir bar was added. The solution was bubbled with nitrogen for two minutes. The sealed bottle was put in a 70° C. oil bath and polymerized with magnetic stirring for 24 hours. A clear polymer solution (20% solids) was obtained without gelation at 70° C. Some polymer crystallization occurred when cooled to room temperature. The crystallized polymer was re-dissolved by simply heating the solution or adding a polar solvent such as N,N-dimethylformamide (DMF) or N-methylpyrrolidone (NMP). Chromatographic analysis of the solution showed that the conversion was 92% and Mn~8,960, Mw~50,200, and Mw/Mn=5.6.

Example 41

Preparation of C4MH/PEGDA-700/A-189 (88/10/2) at 25% Solids

A 500 ml bottle was charged with 45.0 g C4MH solid (MW=723, 62.2 mmol), 5.0 g PEGDA-700, 0.50 g A-189, 151.5 g EtOAc and 1.25 g VAZO-67 (2.47%). A magnetic stir bar was added. The solution was bubbled with nitrogen for two minutes. The sealed bottle was put in a 70° C. oil bath and polymerized with a magnetic stirring for 24 hours. A clear polymer solution (20% solids) was obtained without gelation at 70° C. Some polymer crystallization occurred when cooled to room temperature. The crystallized polymer was re-dissolved by simply heating the solution or adding a polar solvent such as N,N-dimethylformamide (DMF) or N-methylpyrrolidone NMP). Chromatographic analysis of the solution showed that the conversion was 95.4% and Mn ~7270, Mw ~56500, and Mw/Mn=7.8.

TABLE 2

Examples 34-46 and Comparative Example C13

| Example | Formulation | Wt ratio | Solid % | Hours @ 60-70° C. | Results |
|---|---|---|---|---|---|
| 34 | C4MH/PEGDA-700/DDS | 88/10/2 | 30 | 24 | OK |
| 35 | C4MH/PEGDA-700/DDS | 76/20/4 | 20 | 24 | OK |
| 36 | C4MH/PEGDA-700/DDS | 68/30/2 | 20 | 44 | OK |
| 37 | C4MH/PEGDA-700/DDS | 65/33/2 | 20 | 24 | OK |
| C13 | C4MH/PEGDA-700/DDS | 60/38/2 | 20 | 24 | Gelled |
| 38 | C4MH/PEGDA-700/ODA/DDS | 68/10/20/2 | 20 | 24 | OK |
| 39 | C4MH/ODA/HDDA/TDDM | 53/22/19/6 | 25 | 24 | OK |
| 40 | C4MH/PEGDA-700/A-189 | 84/15/1 | 25 | 24 | OK |
| 41 | C4MH/PEGDA-700/A-189 | 88/10/2 | 30 | 24 | OK |
| 42 | C4MH/PEGDA-700/A-189/A-174 | 84/9/2/5 | 20 | 24 | OK |
| 43 | C4MH/PEGDA-700/A-189/VCl$_2$ | 84/9/2/5 | 20 | 24 | OK |
| 44 | C4MH/SR-644/A-189 | 79/20/1 | 20 | 24 | OK |
| 45 | C4MH/SR-344/A-189 | 89/10/1 | 25 | 24 | OK |
| 46 | C4MH/SR-610/A-189 | 89/20/1 | 25 | 24 | OK |

Contact angles for selected materials were measured as described above and the results are reported in Table 3 below.

TABLE 3

Examples 47-65 and Comparative Examples C14-C16

| | | | Contact Angle (advancing/receding) | |
|---|---|---|---|---|
| Example | Formulation | Wt Ratio | Water | Hexadecane |
| 47 | C4MH/PEGDA-700 | 80/20 | 129/104 | 80/71 |
| 48 | C4MH/SR-644 | 90/10 | 124/101 | 77/66 |
| 49 | C4MH/HMH | 90/10 | 121/91 | 80/70 |
| 50 | C4MH/PEGDA-700/ODA | 70/10/20 | 126/96 | 80/59 |
| 51 | C4MH/PEGDA-700/VCl$_2$ | 80/10/10 | 123/107 | 80/70 |
| 52 | C4MH/PEGDA-700/DMAEMA | 85/10/5 | 128/111 | 82/70 |
| 53 | C4MH/PEGDA-700/IEMEKO | 80/10/10 | 125/101 | 80/68 |
| 54 | C4MH/CW750A/HMH | 90/10/5 | 120/101 | 82/70 |
| 55 | C4MH/PEGDA-700/DDS | 86/10/4 | 119/108 | 78/68 |
| 56 | C4MH/PEGDA-700/A-189 | 88/10/2 | 128/112 | 83/68 |
| 57 | C4MH/PEGDA-700/A-189 | 89/10/1 | 113/91 | 82/64 |
| 58 | C4MH/PEGDA-700/A-189 | 84/15/1 | 128/101 | 81/70 |
| 59 | C4MH/SR-644/A-189 | 79/20/1 | 122/100 | 79/67 |
| 60 | C4MH/SR-344/A-189 | 89/10/1 | 132/111 | 81/70 |
| 61 | C4MH/SR-610/A-189 | 89/20/1 | 126/108 | 81/70 |
| C14 | MeFBSEA/PEGDA-700/A-189 | 89/10/1 | 118/46 | 76/44 |
| 62 | C4MH/FBSEEAA | 90/10 | 130/96 | 82/71 |
| 63 | C4MH/FBSEEAA/SR-610 | 90/5/5 | 131/105 | 82/71 |
| C15 | MeFBSEA/FBSEEAA | 90/10 | 118/82 | 72/63 |
| 64 | C4MH/LTMDA | 90/10 | 131/110 | 82/71 |
| 65 | C4MH/LTMDA/SR-610 | 80/10/10 | 116/92 | 72/68 |
| C16 | MeFBSEA/LTMDA | 90/10 | 124/80 | 73/52 |

Examples 66-73

Polymers of the invention were coated on polyester film and dried at 150° C. for 15 minutes. The coated film was cooled to 22° C. at 50% relative humidity in a control room. A 70/30 toluene/isopropanol mixture was smeared onto the coated films using a cotton swab. After solvent evaporated from the film, a 7.6 cm strip of SCOTCH MAGIC TAPE 810 (Available from 3M Company) was laminated on the area where the solvent mixture was smeared and then peeled off by hand. A smooth low peel force was observed on coatings that were resistant to the solvent mixture. These coatings were judged to "pass" the test. If the coating was soluble in the solvent, a qualitatively high and shocky peel force was observed. These coatings were judged to "fail" the test. The results are tabulated in Table 4 below.

TABLE 4

Examples 66-73 and Comparative Examples C17-C19

| Example | Formulation | Result |
|---|---|---|
| C17 | C4MH/ODA(70/30) | Fail |
| C18 | C4MH/HMH(100/0) | Fail |
| C19 | C4MH/HMH(98/2) | Fail |
| 66 | C4MH/HMH(95/5) | Pass |
| 67 | C4MH/HMH(90/10) | Pass |
| 68 | C4MH/PEGDA-700 (90/10) | Pass |
| 69 | C4MH/PEGDA-700/DDS (89/10/1) | Pass |
| 70 | C4MH/PEGDA-700/DDS (88/10/2) | Pass |
| 71 | C4MH/PEGDA-700/DDS (78/20/2) | Pass |
| 71 | C4MH/PEGDA-700/A-189 (88/10/2) | Pass |
| 73 | C4MH/PEGDA-700/A-189/AA {86/10/2/2} | Pass |

Examples 74-75

Release Coatings

The copolymers of the invention were diluted to 5% solids with toluene. The solution was then coated with a #6 wire around (Mayer) rod onto a 1.6 mil primed polyester terephthalate film. The coated film was attached to a fiberboard frame and dried for 15 minutes at 150° C.

The test method used to evaluate the release coatings was a modification of the industry standard peel adhesion test used to evaluate pressure sensitive adhesive coated materials. The standard test is described in detail in various publications of the American Society for Testing and Materials (ASTM), Philadelphia, Pa., and the Pressure Sensitive Tape Council (PSTC), Glenview, Ill. The modified standard method is described in detail below. The reference source of the standard test method is ASTM D3330-78 PSTC-1 (11/75).

2.54 cm by 15.24 cm strips of SCOTCH PERFORMANCE MASKING TAPE 233+ (available from 3M Company, St. Paul, Minn.) were rolled down onto the coated polyester film with a 2.04 kg rubber roller. The laminated samples were then aged 1 week at 22° C. and 50% relative humidity or 16 hours at 65° C. Prior to testing, the heat-aged samples were equilibrated to 22° C. and 50% relative humidity for 24 hours.

Release testing was conducted by mounting the masking tape/coated film laminate to the stage of an Instrumentors, Inc. slip/peel tester (model 3M90) with double coated tape. The force required to remove the masking tape at 180 degrees and 228.6 cm/minute was then measured. Tape re-adhesions were also measured by adhering the freshly peeled masking tape to a clean glass plate and measuring the peel adhesion in normal fashion using the same Instrumentors slip/peel tester indicated above, again peeling at 228.6 cm/min and at a 180 degree peel angle. The results of these peel tests are shown in Table 5.

The backside of a strip of SCOTCH PERFORMANCE MASKING TAPE 233+ served as a control sample.

TABLE 5

Examples 74-75 and Comparative Example C20

| | | 7 Days @ 22° C. | | 16 hrs @ 65° C. | |
| --- | --- | --- | --- | --- | --- |
| Example | Copolymer Coating | Peel Force from Release Coating (g/cm) | Readhesion Peel Force from Glass (g/cm) | Peel Force from Release Coating (g/cm) | Readhesion Peel Force from Glass (g/cm) |
| 74 | C4MH/PEGDA-700/DDS (88/10/2) | 131 | 539 | 161 | 499 |
| 75 | C4MH/PEGDA-700/DDS (78/20/2) | 206 | 513 | 229 | 468 |
| C20 | SCOTCH PERFORMANCE MASKING TAPE 233+ | 198 | 518 | 397 | 452 |

Examples 76-77

Release Coatings

The copolymers of the invention were coated and tested according to the methods described above with the exception that SCOTCH MAGIC TAPE 810 (Available from 3M Company) was used in place of SCOTCH PERFORMANCE MASKING TAPE 233+. The backside of a strip of SCOTCH MAGIC TAPE 810 served as a control sample. The results are shown in Table 6 below.

TABLE 6

Examples 76-77 and Comparative Example C21

| | | 7 Days @ 22° C. | | 16 hrs @ 65° C. | |
| --- | --- | --- | --- | --- | --- |
| Example | Copolymer | Peel Force from Release Coating (g/cm) | Readhesion Peel Force from Glass (g/cm) | Peel Force from Release Coating (g/cm) | Readhesion Peel Force from Glass (g/cm) |
| 76 | C4MH/PEGDA-700/DDS (88/10/2) | 77 | 297 | 101 | 244 |
| 77 | C4MH/PEGDA-700/DDS (78/20/2) | 91 | 294 | 88 | 252 |
| C21 | SCOTCH MAGIC TAPE 810 | 79 | 265 | 150 | 182 |

Examples 78-85

Release Coatings

Release coatings of the invention were prepared and tested according to the methods described above using a silicone polyurea pressure sensitive adhesive that was prepared and coated as described in U.S. Pat. No. 6,569,521 (see Example 31). The peel force from the release coating and subsequent readhesion peel force from glass were measured. The results are shown in Table 7 below.

TABLE 7

| | | Examples 78-85 | | | |
|---|---|---|---|---|---|
| | | 7 Days @ 22° C. | | 16 hrs @ 65° C. | |
| Example | Copolymer | Peel Force from Release Coating (g/cm) | Readhesion Peel Force from Glass (g/cm) | Peel Force from Release Coating (g/cm) | Readhesion Peel Force from Glass (g/cm) |
| 78 | C4MH/PEGDA-700/A-189 (88/10/2) | 5 | 565 | 10 | 586 |
| 79 | C4MH/PEGDA-700/A-189/AA (86/10/2/2) | 6 | 808 | 13 | 621 |
| 80 | C4MH/PEGDA-700/A-174 (86.5/9.6/3.9) | 16 | 677 | 15 | 661 |
| 81 | C4MH/CW750A/HMH (90/10/5) | 12 | 651 | 12 | 585 |
| 82 | C4MH/CW750A/BDDA (90/10/5) | 260 | 518 | 190 | 574 |
| 83 | C4MH/HMH (90/10) | 91 | 684 | 39 | 739 |
| 84 | C4MH/DEGDA (90/10) | 108 | 761 | 47 | 496 |
| 85 | C4MH/BDDA (90/10) | 260 | 518 | 190 | 574 |

The referenced descriptions contained in the patents, patent documents, and publications cited herein are incorporated by reference in their entirety as if each were individually incorporated.

Various modifications and alteration to this invention will become apparent to those skilled in the art without departing from the scope and spirit of this invention. It should be understood that this invention is not intended to be unduly limited by the illustrative embodiments and examples set forth herein and that such examples and embodiments are presented by way of example only with the scope of the invention intended to be limited only by the claims set forth herein as follows.

We claim:

1. A composition comprising a copolymer comprising repeating units derived from at least one co-reactant comprising two or more acrylate groups and repeating units derived from a fluoroacrylate comprising the reaction product of:

(a) at least one fluorochemical alcohol represented by the formula:

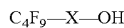

C$_4$F$_9$—X—OH wherein:

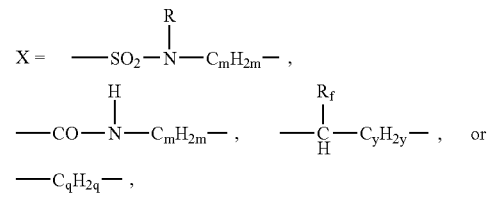

R=hydrogen or an alkyl group of 1 to 4 carbon atoms,
m=2 to 8,
R$_f$=C$_n$F$_{2n+1}$,
n=1 to 5,
y=0 to 6, and
q=1 to 8;

(b) at least one unbranched symmetric diisocyanate; and (c) at least one hydroxy-terminated alkyl (meth)acrylate or 2-fluoroacrylate monomer having 2 to about 30 carbon atoms in its alkylene portion;

wherein the composition is coatable.

2. The composition of claim 1 wherein the weight ratio of co-reactant to fluoroacrylate is about 35:65 or less.

3. The composition of claim 2 wherein the weight ratio of co-reactant to fluoroacrylate is about 20:80 or less.

4. The composition of claim 1 wherein the co-reactant is a tri(meth)acrylate or a di(meth)acrylate.

5. The composition of claim 4 wherein the co-reactant is a di(meth)acrylate.

6. The composition of claim 5 wherein the co-reactant is a fluorinated di(meth)acrylate.

7. The composition of claim 1 wherein the unbranched symmetric diisocyanate is an aromatic diisocyanate.

8. The composition of claim 1 wherein the copolymer further comprises at least one chain transfer agent.

9. The composition of claim 8 wherein the chain transfer agent is selected from the group consisting of thiols, secondary alcohols, and polyhalocarbons.

10. The composition of claim 1 wherein the copolymer further comprises at least one comonomer.

11. The composition of claim 1 further comprising a solvent.

12. An article comprising a substrate having one or more surfaces coated with the composition of claim 1.

13. The article of claim 12 wherein the substrate comprises a material selected from the group consisting of polyethylene terephthalate, polyolefins, and polyolefin coated paper.

14. The article of claim 12 wherein the substrate is a fibrous substrate.

15. The article of claim 12 wherein the article is a release liner.

16. The composition of claim 11 wherein said solvent comprises water or an organic solvent.

17. The composition of claim 1 wherein the composition is a release coating composition.

18. The composition of claim 1 wherein component (c) comprises at least one hydroxy-terminated alkyl (meth)acrylate monomer having 2 to about 30 carbon atoms in its alkylene portion.

19. The composition, of claim 18 wherein the at least one hydroxy-terminated alkyl (meth)acrylate monomer comprises hydroxy ethyl acrylate, hydroxy butyl acrylate, hydroxy hexyl acrylate, hydroxy decyl acrylate, hydroxy dodecyl acrylate, and mixtures thereof.

20. The composition of claim 1 wherein component (c) comprises at least one hydroxy-terminated 2-fluoroacrylate monomer having 2 to about 30 carbon atoms in its alkylene portion.

21. The composition of claim 5 wherein the di(meth)acrylate comprises ethylene glycol di(meth)acrylate; diethylene glycol di(meth)acrylate; triethylene glycol di(meth)acrylate; tetraethylene glycol di(meth)acrylate; 1,4-butanediol di(meth)acrylate; 1,6-hexanediol di(meth)acrylate; alkoxylated 1,6-hexanediol diacrylates; tripropylene glycol diacrylate; dipropylene glycol diacrylate; cyclohexane dimethanol di(meth)acrylate; alkoxylated cyclohexane dimethanol diacrylates; ethoxylated bisphenol A di(meth)acrylates; neopentyl glycol diacrylate; polyethylene glycol di(meth)acrylates; polypropylene glycol di(meth)acrylates; urethane di(meth)acrylates; $C_4F_9SO_2N(CH_2CH_2OC(O)CH=CH_2)_2$; $CH_2=CHCO_2CH_2CF_2(OCF_2CF_2)_n(OCF_2)_mCH_2OC(O)CH=CH_2$, $CH_2=CHCO_2CH_2CH_2OC(O)NH$; or $C_6H_4CH_2C_6H_4NHCOOCH_2CH_2OC(O)CH=CH_2$.

22. The composition of claim 5 wherein the di(meth)acrylate comprises polyethylene glycol di(meth)acrylates; polypropylene glycol di(meth)acrylates; 1,4-butanediol di(meth)acrylate; 1,6-hexanediol di(meth)acrylate; or $CH_2=CHCO_2CH_2CF_2(OCF_2CF_2)_n(OCF_2)_mCH_2OC(O)CH=CH_2$, $CH_2=CHCO_2CH_2CH_2OC(O)NH$.

23. The composition of claim 4 wherein the co-reactant is a tri(meth)acrylate.

24. The composition of claim 23 wherein the tri(meth)acrylate comprises trimethylolpropane tri(meth)acrylate; propoxylated trimethylolpropane triacrylates; ethoxylated trimethylolpropane triacrylates; tris (2-hydroxy ethyl)isocyanurate triacrylate; or pentaerythritol triacrylate.

25. The composition of claim 10 wherein said at least one comonomer comprises methyl (meth)acrylate; butyl acrylate; isobutyl (meth)acrylate; hexyl acrylate; dodecyl acrylate; or octadecyl acrylate.

26. A composition comprising a copolymer comprising repeating units derived from at least one co-reactant comprising two or more acrylate groups and repeating units derived from a fluoroacrylate comprising the reaction product of:

(a) at least one fluorochemical alcohol represented by the formula:

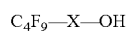

wherein:

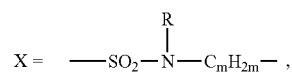

R=hydrogen or an alkyl group of 1 to 4 carbon atoms, and m=2 to 4;

(c) at least one unbranched symmetric diisocyanate; and (c) at least one hydroxy-terminated alkyl (meth)acrylate monomer having 2 to about 30 carbon atoms in its alkylene portion;

wherein the composition is coatable.

27. The composition of claim 26 wherein R is a methyl group.

28. The composition of claim 26 wherein the at least one hydroxy-terminated alkyl (meth)acrylate monomer comprises hydroxy ethyl acrylate, hydroxy butyl acrylate, hydroxy hexyl acrylate, hydroxy decyl acrylate, hydroxy dodecyl acrylate, and mixtures thereof.

29. The composition of claim 26 wherein the co-reactant comprises polyethylene glycol di(meth)acrylates; polypropylene glycol di(meth)acrylates; 1,4-butanediol di(meth)acrylate; 1,6-hexanediol di(meth)acrylate; or $CH_2=CHCO_2CH_2CF_2(OCF_2CF_2)_n(OCF_2)_mCH_2OC(O)CH=CH_2$, $CH_2=CHCO_2CH_2CH_2OC(O)NH$.

30. The composition of claim 26 wherein the copolymer further comprises at least one comonomer.

31. The composition of claim 30 wherein said at least one comonomer comprises methyl (meth)acrylate; butyl acrylate; isobutyl (meth)acrylate; hexyl acrylate; dodecyl acrylate; or octadecyl acrylate.

32. The composition of claim 26 wherein the composition is a release coating composition.

* * * * *

UNITED STATES PATENT AND TRADEMARK OFFICE
CERTIFICATE OF CORRECTION

PATENT NO. : 7,345,123 B2
APPLICATION NO. : 11/027612
DATED : March 18, 2008
INVENTOR(S) : Zai-Ming Qiu It is certified that error appears in the above-identified patent and that said Letters Patent is hereby corrected as shown below:

Title page,
Item [57], ABSTRACT, line 25, delete "y 32 0" and insert -- y=0 --, therefor.

Column 12,
Line 61, delete "ref lux" and insert -- reflux --, therefor.

Column 13,
Line 12, Delete "(MFBSEEAAE)" and insert -- (MeFBSEEAA) --, therefor.
Line 24, After "Tables 1-3" insert -- . --.

Column 16,
Line 64, delete "NMP)." and insert -- (NMP). --, therefor.

Column 18,
Line 48, delete "around" and insert -- wound --, therefor.

Column 23,
Line 26, in Claim 19, after "composition" delete ",".

Signed and Sealed this

Second Day of September, 2008

JON W. DUDAS
*Director of the United States Patent and Trademark Office*